United States Patent
Wu Chang

(10) Patent No.: US 6,834,578 B1
(45) Date of Patent: Dec. 28, 2004

(54) OIL-CASTING DEVICE FOR DEEP-FRYING BASKET

(75) Inventor: Li Chen Wu Chang, Pa-Te (TW)

(73) Assignee: Lyu Jan Co., Ltd., Taoyuan Hsien (TW)

( * ) Notice: Subject to any disclaimer, the term of this patent is extended or adjusted under 35 U.S.C. 154(b) by 0 days.

(21) Appl. No.: 10/855,710

(22) Filed: May 28, 2004

(51) Int. Cl.[7] .......................... A47J 37/00; A47J 37/12; A23L 1/00
(52) U.S. Cl. ............................ 99/413; 99/403; 99/407; 99/411; 366/110; 366/128
(58) Field of Search .......................... 99/330–336, 339, 99/340, 357, 403–418, 444–450, 516; 366/127, 128, 108–116; 210/DIG. 8, 464–470; 220/912, 751; D7/354, 409; 211/181.1

(56) References Cited

U.S. PATENT DOCUMENTS

| | | | | |
|---|---|---|---|---|
| 1,198,374 A | * | 9/1916 | Overbury | 99/410 |
| 3,078,786 A | * | 2/1963 | Arvan | 99/407 |
| 3,731,614 A | * | 5/1973 | Smith et al. | 99/404 |
| 3,799,048 A | * | 3/1974 | Finley | 99/415 |
| 4,852,471 A | * | 8/1989 | Lansing | 99/330 |
| 5,379,684 A | * | 1/1995 | Ettridge | 99/336 |
| 5,746,117 A | * | 5/1998 | Chang | 99/407 |
| 6,006,658 A | * | 12/1999 | Siu | 99/336 |
| 6,240,837 B1 | * | 6/2001 | Chang | 99/411 |
| 6,250,213 B1 | * | 6/2001 | De'Longhi | 99/407 |
| 6,732,636 B1 | * | 5/2004 | Germano | 99/411 |

* cited by examiner

Primary Examiner—Timothy F. Simone

(57) ABSTRACT

An oil-casting device for deep-frying basket includes a vibration device, which is provided with a motor. A central spindle of the motor is arranged penetrating a through hole of a movable member seat to joint with an eccentric wheel. The movable member seat is combined with a movable member by insertion pins, and the top end of the movable member is in connection with an eccentric wheel seat. An eccentric axle of the eccentric wheel is penetratingly disposed in an axle hole in front of the eccentric wheel seat. An eccentric lever is arranged in rear of the axle hole and inserted in an eccentric lever seat inside a hook lower cover, and the outer circumference of the eccentric lever seat is sheathed on a grip of a supporting rack of deep-frying basket. And finally, the hook lower cover is combined with a handle of deep fryer having a hook upper cover to complete the architecture of the device.

4 Claims, 4 Drawing Sheets

OIL-CASTING DEVICE FOR DEEP-FRYING BASKET

BACKGROUND OF THE INVENTION

1. Field of the Invention

The present invention relates generally to an oil-casting device for deep-frying basket, and particularly to a vibration device mounted on a deep fryer, which moves a deep-frying basket back and forth to efficiently drain the oil attached thereon.

2. The Prior Arts

An existing deep-frying basket is usually structured by setting a rack peripherally, which is extended backwards to form a knob. In using the conventional deep-frying basket, a chicken leg for example is placed in the basket, and then a user holds the knob and dips the basket into a deep fryer for frying the food inside. After the job is done, the user holds the knob to uplift and joggle the deep frying basket to thereby cast off the oil attached. The way to cast off oil manually as mentioned works well but improvements can still be made to enhance the oil casting operation.

SUMMARY OF THE INVENTION

The primary object of the present invention is to provide an oil casting device for deep-frying basket, in which a vibration device that can drive an oil-casting device to move back and forth is attached onto a deep fryer for casting oil.

In order to realize above object, a vibration device, which is provided with a motor, is disposed on a deep fryer. A central spindle of the motor extends through a through hole of a movable member seat to joint with an eccentric wheel. The movable member seat is combined with a movable member by insertion pins, and the top end of the movable member is in connection with an eccentric wheel seat. An eccentric axle of the eccentric wheel is penetratingly disposed in an axle hole in front of the eccentric wheel seat. An eccentric lever is arranged in rear of the axle hole and inserted in an eccentric lever seat inside a lower cover comprised of a hook, and the outer circumference of the eccentric lever seat is sheathed on a grip of a supporting rack of deep-frying basket. The hook lower cover is combined with a handle of deep fryer having an upper cover comprised of the hook.

In operation, the motor is first empowered to rotate, so that the central spindle thereof would drive the eccentric wheel to rotate too. In turn, the eccentric axle in the axle hole of the eccentric wheel seat, then, the movable member, the hook lower cover, the hook upper cover, and the handle of deep fryer are driven sequentially to move back and forth on the movable seat. And finally, the supporting rack of deep-frying basket inserted in the hook lower cover is driven to move back and forth to thereby cast off the fried oil sustained in the deep-frying basket.

The improvements made in the present invention is that because of the vibration device arranged on a deep fryer, the supporting rack of deep-frying basket can be moved back and forth to thereby cast off the fried oil sustained in the deep-frying basket automatically and facilitate the job for production of massive fried foods.

For more detailed information regarding advantages or features of the present invention, at least one example of preferred embodiment will be described below with reference to the annexed drawings.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

Figure 1:
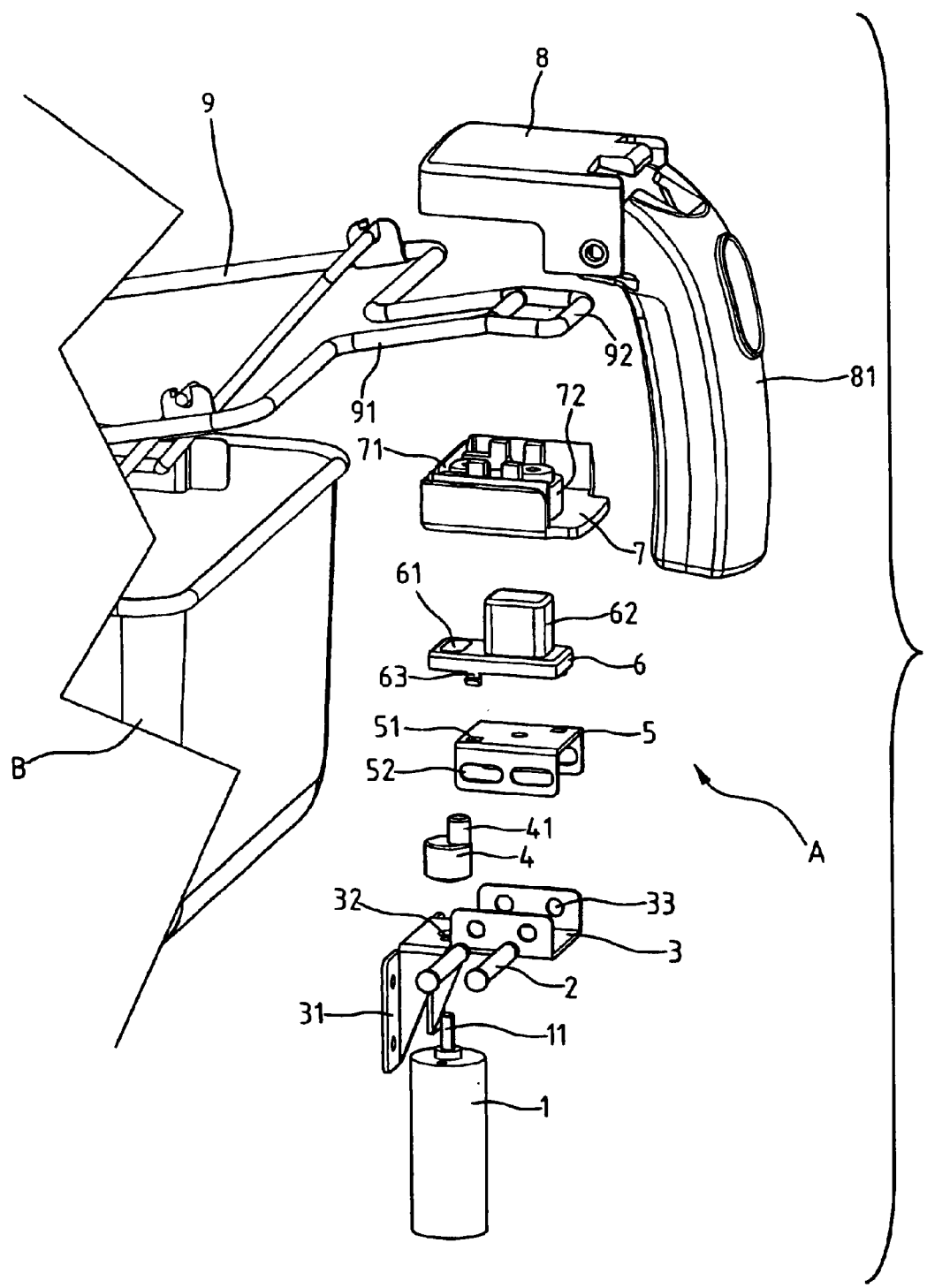
FIG. 1 is an exploded view of an oil-casting device for deep-frying basket of the present invention.

With reference to the drawings and in particular to FIG. 1, an oil-casting device for deep-frying basket in accordance with the present invention comprises a vibration device A disposed in a deep fryer (not shown). The vibration device A is comprised of a motor 1 having a central spindle 11, a plurality of insertion pins 2, a movable member seat 3, an eccentric wheel 4 having an eccentric axle 41, a movable member 5, an eccentric wheel seat 6, a hook comprised of a lower cover 7 and an upper cover 8, and a supporting rack 9 of deep-frying basket.

The movable member seat 3 is a right-angular seat provided with: a fixing piece 31 as a vertical portion having a plurality of through holes and a horizontal portion having a through hole 32; and a U-channel with two lateral walls formed aside the through hole 32, in which two pairs of circular holes 33 are aligned to look at each other straightforward respectively.

The movable member 5 is an inverse U-channel having two hook eyes 51 diagonally arranged in the top surface thereof and two pairs of longitudinal holes 52 located at positions in respective lateral walls corresponding to the circular holes 33 of the movable member seat 3, in which the longitudinal holes 52 are aligned to look at each other straightforward respectively.

The eccentric wheel seat 6 is a rectangular architecture having a vertically perforated front axle hole 61, a rear eccentric rod 62, and a hook portion 63 positioned on each of two sides corresponding to the hook eyes 51 of the movable member 5.

The hook lower cover 7 is located above the eccentric wheel seat 6 and enclosed by an upward lateral wall on two sides and the front end thereof. The hook lower cover 7 is further provided with a hollow eccentric lever seat 71 at its central portion and two grooves 72 on the front sidewalls.

The hook upper cover 8 is a casing located correspondingly to the hook lower cover 7, and two sides thereof are pivotally jointed with a handle of deep fryer 81.

A grip 91 is provided to the tail end of the supporting rack 9 of deep-frying basket, and a square structure 92 is formed at the tail end of the grip 91.

Figure 2:
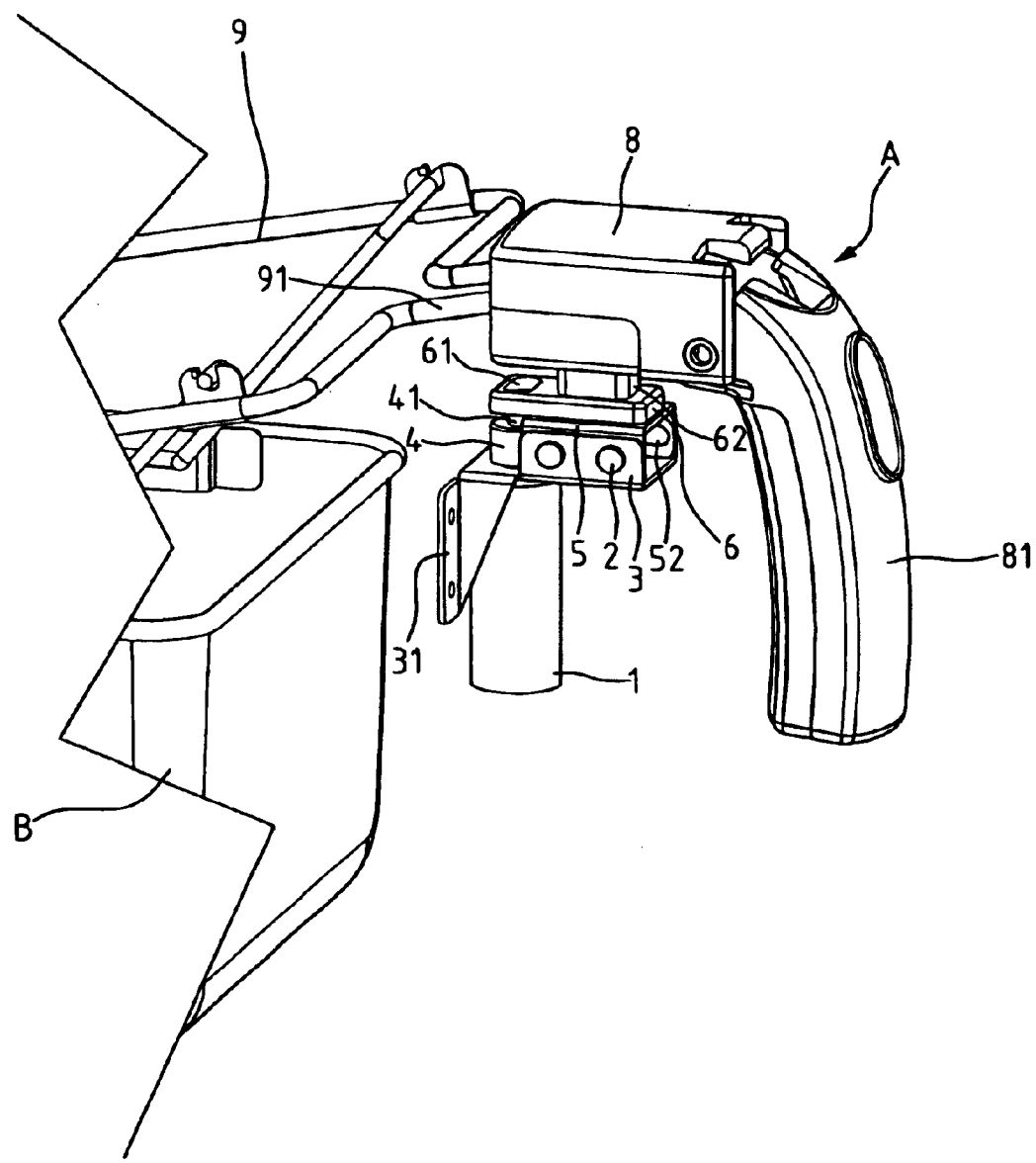
FIG. 2 is a schematic assembled view of the present invention.
Figure 3:
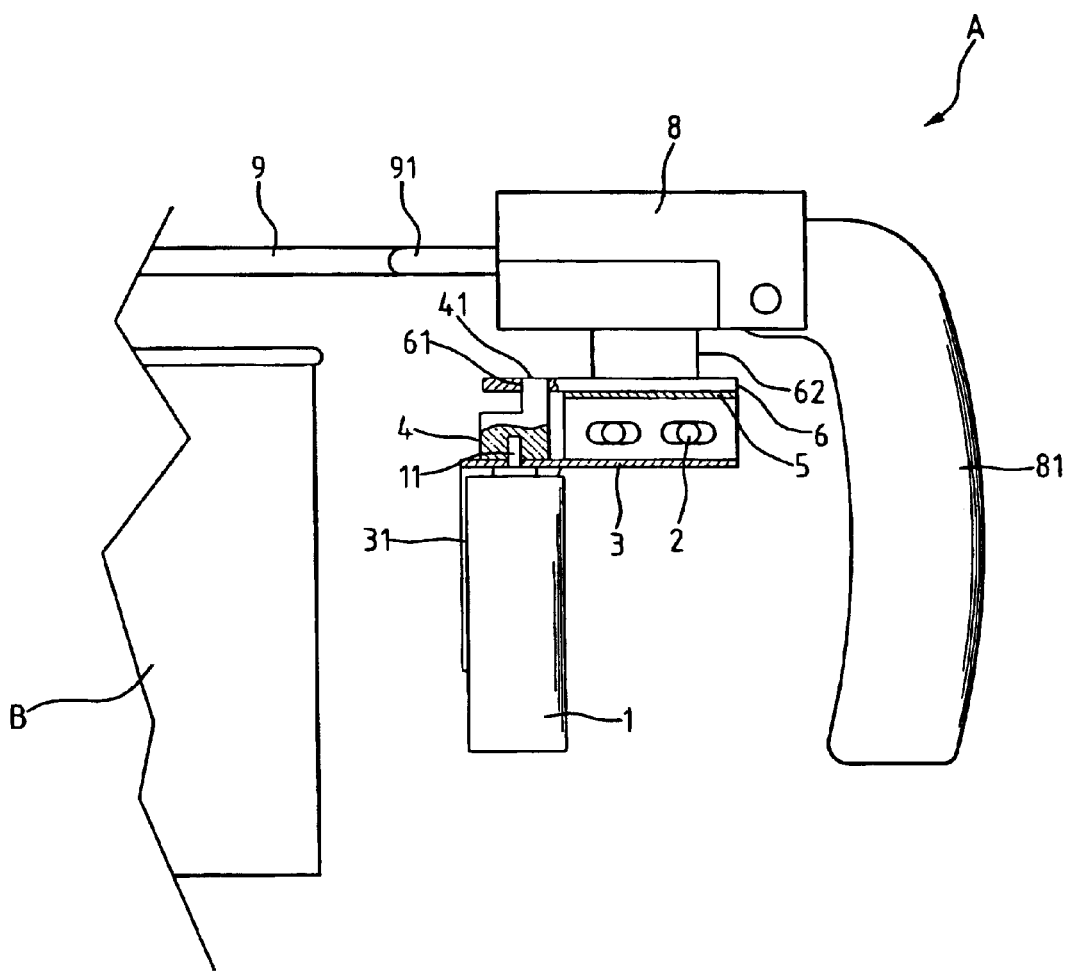
FIG. 3 is a cutaway sectional view of FIG. 2.

Also referring to FIGS. 2 and 3, when assembling, the fixing piece 31 is first attached externally on a deep fryer (not shown). Then, a bolt is screwed in a hole of the fixing piece 31 such that the movable member seat 3 is combined with the deep fryer. Now, the central spindle 11 is held to penetrate the through hole 32 of the movable member seat 3 and insert in the eccentric wheel 4. Then, the longitudinal holes 52 on two sides of the movable member 5 are aligned and combined with the circular holes 33 on two sides of the movable member seat 3 using the insertion pins 2. The following step is to set the hook portions 63 on two sides of the eccentric wheel seat 6 in the hook eyes 51 in the top surface of the movable member 5 to thereby joint the eccentric wheel seat 6 and the movable member 5 together. Meanwhile, the eccentric axle 41 of the eccentric wheel 4 is positioned in the axle hole 61 of the eccentric wheel seat 6.

Next, the hollow eccentric lever seat 71 on the hook lower cover 7 is sheathed on the eccentric rod 62 of the eccentric wheel seat 6 to hence combine the hook lower cover 7 with the eccentric wheel seat 6. And, at this time, the step is to place the grip 91 at the tail end of the supporting rack 9 of a deep-frying basket B and the square structure 92 into the grooves 72 and sheath them on the eccentric lever seat 71. Finally, the book upper cover 8, which is combined to the handle of deep fryer 81 with its two sides, is buckled to an external verge of the hook lower cover 7 to complete the assembling job of the vibration device A onto the deep fryer.

Figure 4:
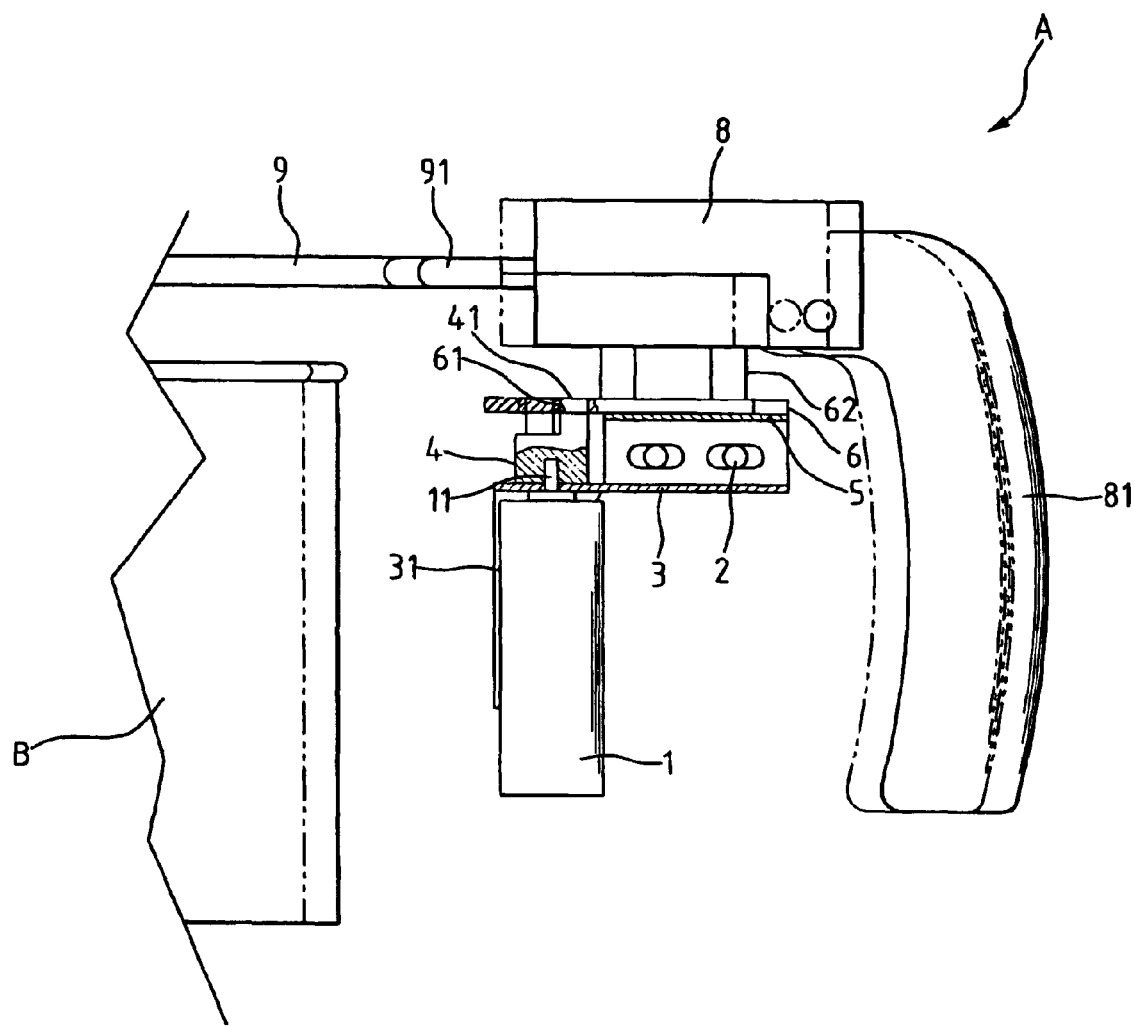
FIG. 4 is a schematic view showing the action state of FIG. 3.

Also referring to FIG. 4, to operate the present invention, the procedure is started first to empower the motor 1 to rotate such that the eccentric wheel 4 is driven to rotate by the central spindle 11 at one end face of the motor 1. The eccentric axle 41 on the eccentric wheel 4 now can move back and forth in the axle hole 61 of the eccentric wheel seat 6 to drive in turn the combined movable member 5, eccentric wheel seat 6, hook lower cover 7, hook upper cover 8, and the handle of deep fryer 81 such that the longitudinal holes 52 of the movable member 5 will move back and forth on the movable member seat 3 along the combined insertion pins 2. Hence, the supporting rack 9 of deep-frying basket sheathed on the hook lower cover 7 is driven to move back and forth to thereby enable the combined deep-frying basket B to achieve the oil-casting effect.

In the above described, at least one preferred embodiment has been described in detail with reference to the drawings annexed, and it is apparent that numerous changes or modifications may be made without departing from the true spirit and scope thereof, as set forth in the claims below.

What is claimed is:

1. An oil-casting device for a deep-frying basket, comprising a vibration device adapted to attach to a deep fryer, the vibration device comprising:
   a movable member seat, which is combined to the deep fryer and provided with a through hole, two sides in rear of the through hole are extended to form respective lateral walls having opposite corresponding circular holes;
   a motor, having a central spindle penetrating through the through hole of the movable member seat;
   an eccentric wheel, having an eccentric axle disposed thereon, which is sheathed on the central spindle of the motor;
   a movable member, which is shaped in an inverse U-structure and provided with: a plurality of hook eyes diagonally arranged in corresponding positions in a top surface thereof and a plurality of opposite longitudinal holes formed in respective lateral walls and located in positions corresponding with the circular holes of the movable member seat;
   a plurality of insertion pins placed in the circular holes of the movable member seat and the longitudinal holes of the movable member;
   an eccentric wheel seat, comprising an axle hole arranged thereon, an eccentric lever located in rear of the axle hole, and a hook portion positioned on each of two sides of the wheel seat corresponding to the hook eyes of the movable member;
   a hook lower cover, comprising an upward lateral wall erected to enclose two sides and a front end thereof, a hollow eccentric lever seat arranged centrally, two grooves formed in the front portion of the lateral wall, in which the eccentric lever seat is sheathed on the eccentric lever of the eccentric wheel seat;
   a supporting rack for deep-frying basket, having a grip which is formed at the rear end thereof and inserted in the grooves of the hook lower cover to therefore combine with the eccentric lever seat; and
   a hook upper cover, which is buckled with the outer circumference of the hook lower cover.

2. The oil-casting device according to claim 1, wherein the movable member seat is shaped in right angle provided with a fixing piece as a vertical portion thereof, which is locked with a bolt to combine to a deep fryer.

3. The oil-casting device according to claim 1, wherein the tail end of the grip of the supporting rack for deep-frying basket is formed in a square structure to be inserted in the eccentric lever seat.

4. The oil-casting device according to claim 1, wherein the hook upper cover is a casing having its two sides pivotally jointed with a handle of deep fryer.

* * * * *